Sept. 9, 1941.　　　J. M. POCHÉ　　　2,255,365
VEHICLE WHEEL MOUNTING
Filed Sept. 2, 1939　　　3 Sheets-Sheet 3
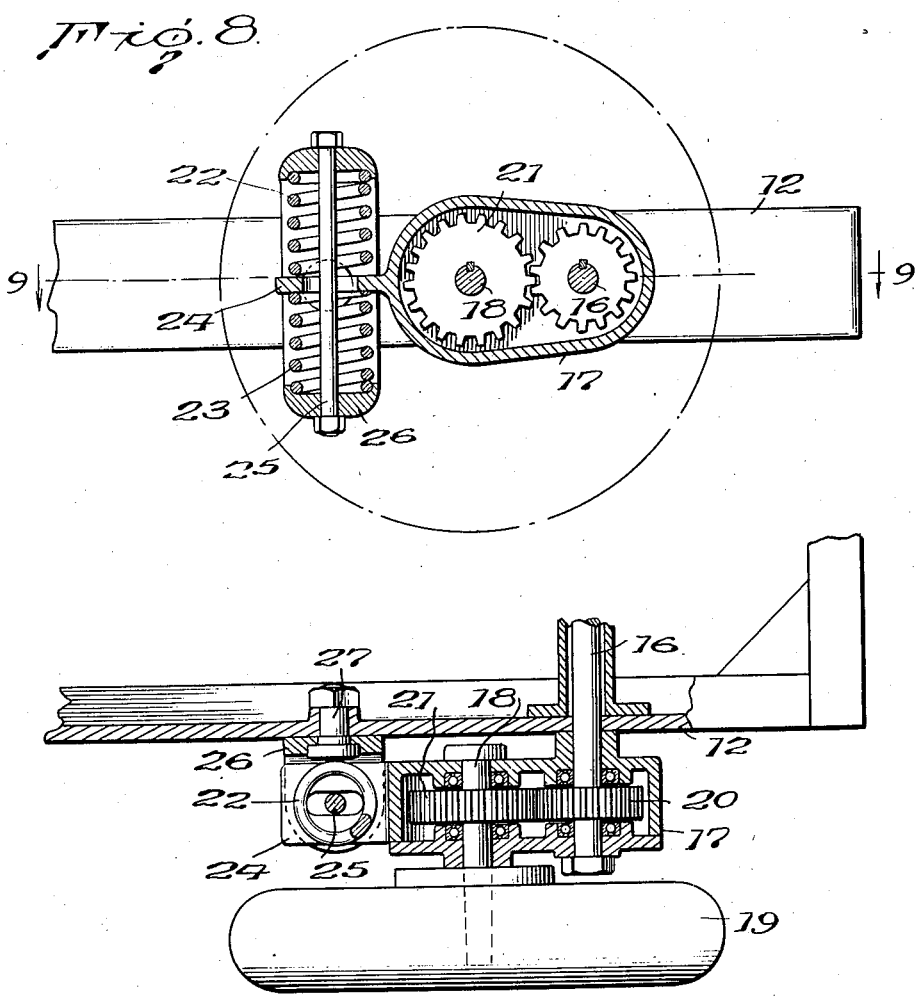
Inventor
John M. Poché,
By Church & Church
His Attorneys

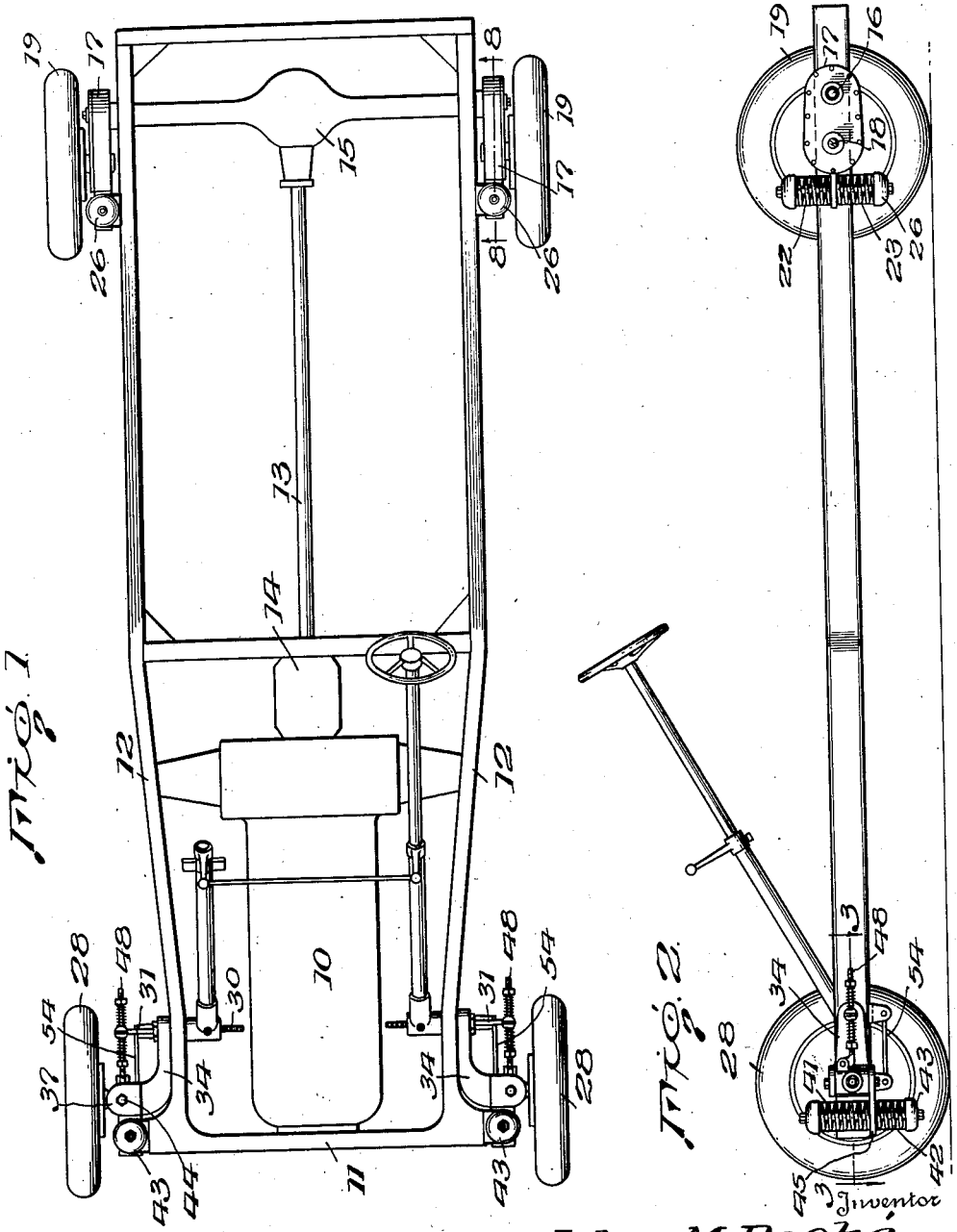

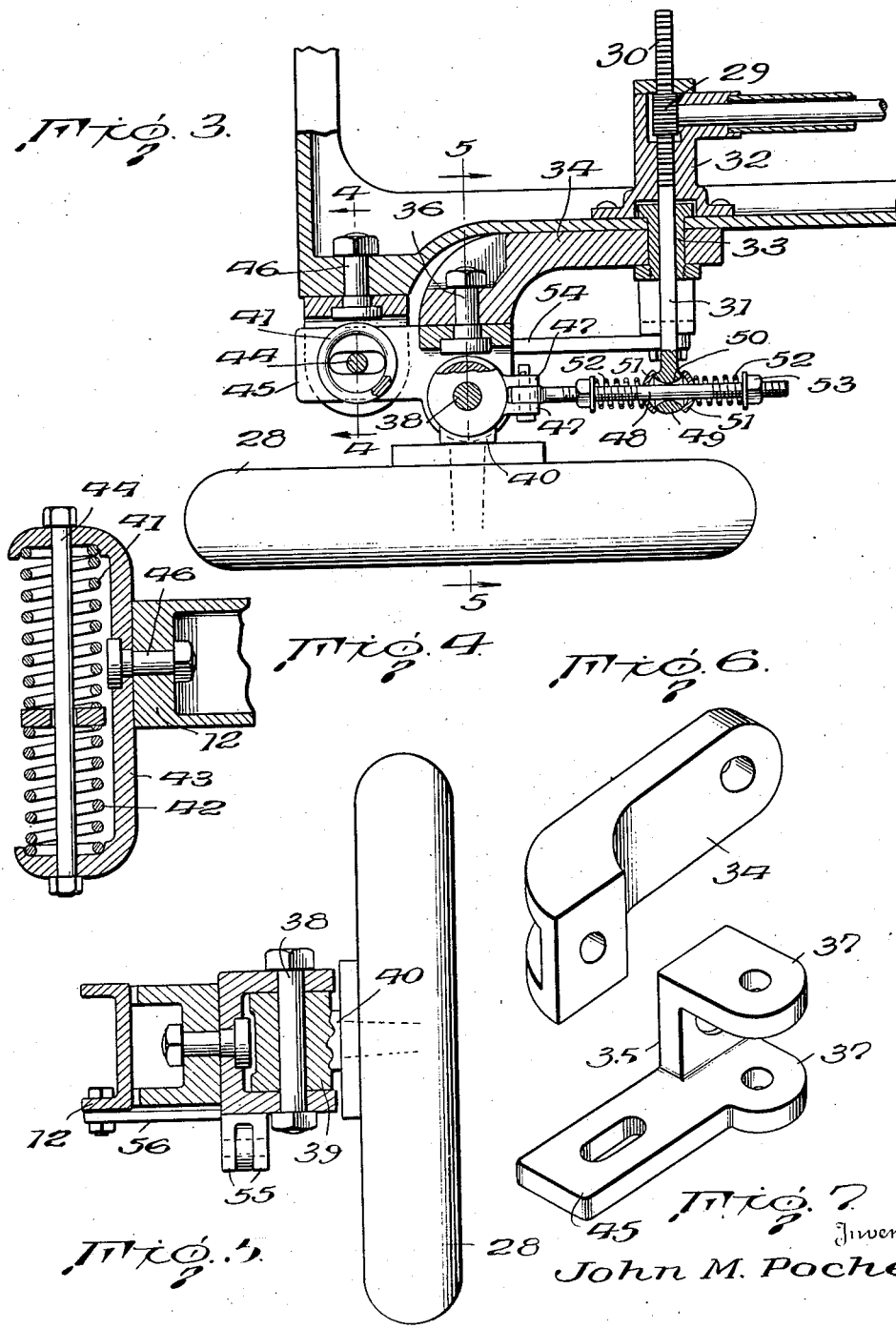

Patented Sept. 9, 1941

2,255,365

UNITED STATES PATENT OFFICE 2,255,365

VEHICLE WHEEL MOUNTING

John Morris Poché, Gulfport, Miss., assignor of one-half to Lucas Vaccaro, New Orleans, La.

Application September 2, 1939, Serial No. 293,273

5 Claims. (Cl. 267—20)

This invention relates to improvements in the mountings for vehicle wheels.

One object of the invention is to provide a wheel mounting which will permit the wheels of the vehicle to rise or be depressed to accommodate themselves to irregularities in the roadway, without such movements being transmitted to the chassis frame.

A further object is to provide a mounting for vehicle wheels comprising this so-called knee action movement and in which the wheels are supported on axles or shafts extending through side sills of the chassis frame.

A still further object of the invention is to provide a mounting for vehicle wheels normally located above the lower edge of the chassis frame, whereby the vehicle may be said to be streamlined on its under surface in that, under normal running conditions, there are no structural elements depending below the chassis frame.

Another object of the invention is to provide a mounting for vehicle wheels comprising the above so-called knee action movement and wherein the shafts or axles on which the wheels are supported, as well as the drive shaft from the power unit of the vehicle may be journaled or carried in fixed bearings and, if desired, the drive shaft or crank shaft may be connected directly to the axles of the drive wheels without the interpositioning of the usual universal joint.

With these and other objects in view, the invention consists in certain details of construction and combinations and arrangements of parts, all as will hereinafter be more fully described, and the novel features thereof particularly pointed out in the appended claims.

In the accompanying drawings—

Figure 1 is a plan view of a chassis frame having the wheels of the vehicle mounted thereon in accordance with the present invention, the power unit and drive connections to the drive wheels being shown more or less in outline;

Fig. 2 is a side elevational view of the chassis frame, but with the wheels at the near side of the frame removed;

Fig. 3 is a horizontal sectional view on the line 3—3 of Fig. 2;

Fig. 4 is a vertical sectional view on the line 4—4 of Fig. 3;

Fig. 5 is a similar view on the line 5—5 of Fig. 3;

Figs. 6 and 7 are detail perspective views of the members in which the front steering wheels of the vehicle are pivoted;

Fig. 8 is a vertical longitudinal sectional view on the line 8—8 of Fig. 1; and

Fig. 9 is a horizontal sectional view on the line 9—9 of Fig. 8.

The power unit 10 in a vehicle provided with the form of wheel mounting contemplated by the present invention may be rigidly mounted in the front cross-member 11 of the chassis frame and in the side sills 12 of said frame and, in accordance with usual practice, the drive shaft 13 extends rearwardly from the transmission 14 to differential housing 15. Extending transversely from the differential housing 15 at the rear of the chassis frame are drive shafts 16, each of which projects through and is journaled in the side sill 12 of the chassis frame, as more particularly illustrated in Figs. 8 and 9. Journaled on each shaft 16, at the exterior of the frame, is a gear housing 17 and, journaled in the side walls of this housing, there is a wheel axle 18 on which the wheel 19 is mounted. Suitable bearings may be provided in this gear housing 17 for both the shaft 16 and the axle 18. Mounted on each shaft 16 within the housing 17 is a gear 20 which meshes with a second gear 21 on the wheel axle, whereby rotary motion of the shaft 16 is transmitted to the axle 18 and the wheel carried by the latter. With this construction, it will be apparent that, as the wheel encounters irregularities in the surface of the roadway over which it is traveling, it may rise or fall and only a swinging movement will be imparted to the gear housiing 17, the gear 18 rolling, so to speak, around the gear 20. Thus, no torque whatever is imparted to the shaft 16.

To normally sustain the gear housing 17 in substantially the same horizontal plane as the side sills of the chassis frame and to resist the up and down movement of which the wheels may partake in encountering irregularities in the road surface, there is provided a pair of springs 22, 23, above and below an extension 24 on the gear housing so that, as the gear housing is rocked about the shaft 16, one or the other of the springs 22, 23, will act to yieldingly restrain such movement. Preferably, the springs 22, 23, are retained by a through bolt 25 in a spring housing 26 pivotally supported by a pivot pin 27 extending transversely through the side sill of the chassis frame. With this arrangement, the spring housing 26 is free to rock to accommodate itself to the swinging movements of the gear housing 17. This pivotal mounting of the spring housing 26 tends to reduce the strains imposed on the springs 22, 23, and materially increases the life of those elements.

In the case of the steering ground wheels 28 at the front of the vehicle, the steering connections comprise pinions 29 meshing with racks 30 formed on reciprocatory shafts 31 which extend laterally through the side sills of the chassis frame. Preferably, these shafts 31 are slidably mounted in bearing blocks 32 secured to the inner faces of the side sills and in each side sill there is also, preferably, a bushing 33 surrounding the shaft 31 at the exterior of the sills. These bushings 33 facilitate the pivotal mounting of members in which the front ground wheels are carried. Preferably, these wheel-supporting members are of sectional construction comprising an inner section 34 pivotally supported on the bushing 33 to swing in a vertical plane, and an outer section 35 pivoted by a pin 36 on the inner section 34. This outer section 35 of the wheel-supporting member is formed with upper and lower ears or lugs 37 for reception of a pivot pin 38 on which there is pivoted, between the ears 37, a block 39 having formed thereon an axle 40 for the wheel. As will be apparent, when the wheel 28 encounters any irregularities in the road surface, it is free to rise or fall by reason of the fact that its supporting member and, particularly, the portion 34, can swivel or rock in a vertical plane. As in the case of the rear wheel mountings, this rocking motion of the wheel-supporting member is yieldingly resisted by means of upper and lower springs 41, 42, positioned in a spring housing 43 by a through bolt 44, the springs being located above and below an extension 45 on the outer section 35 of the wheel-supporting member. Preferably, the spring housing 43 is pivotally supported on the side sill 12 of the chassis by a pivot pin 46, so that the spring housing, together with the springs, may rock to accommodate themselves to the movements of the wheel-supporting member.

For steering the vehicle, the axle block 39 is provided with laterally projecting ears 47 between which there is secured a connecting rod 48, the latter being connected to the shaft 31 of the steering connections. Connecting rod 48 should, of course, be secured to shaft 31 by means which will permit of more or less a universal movement. In the present instance, this connection is shown as comprising an enlargement 49 on the extremity of the shaft 31, said enlargement being formed with an opening therein for reception of the connecting rod, the wall 50 of said opening being of convex formation throughout its entire circumference, whereby the rod 48 may rock in any direction. At each side of the enlargement 49, this connecting rod 48 carries a concave plate 51 yieldingly held against the surface of the enlargement 49 by a spring 52, the tension or compression of the springs 52 being determined by nuts 53 threaded on the connecting rod. While this is the preferred form of universal joint between members 31 and 48, it will be appreciated that other forms of such a joint may readily be substituted.

With this construction, rotation of the steering post will, by means of the pinion 29 and rack 30, shift member 31 inwardly or outwardly with respect to the chassis frame and thereby turn the wheel on its pivot pin 38 in one direction or the other to guide the vehicle, as desired. At the same time, the inner section 34 of the wheel-supporting member being pivotally supported on the shaft 31, the ground or steering wheel is free to rise or fall as it encounters irregularities in the road surface without transmitting any strains or altering the vertical position of the chassis frame.

As previously described, the outer section 35 each wheel-supporting member is pivotally supported by a pin 36 on the inner section 34 of that member, whereby one section may rock with respect to the other in order to maintain the pivot pin of the wheel in a vertical position. To lend further support to this outer section of the wheel-supporting member, there is a brace rod 54 pivotally connected between ears 55 on the under surface of outer section 35 and, also, to a bracket 56 securely attached to the side sill 12 of the chassis frame. Thus, in conjunction with the pivotal movement of the spring housing 43, the pivot pin 38 of the wheel will always maintain its vertical position.

With the present construction, all the wheels of the vehicle are free to yield or move relatively to the chassis frame when they encounter irregularities in the road surface and these movements of the wheels will not be imparted to the chassis frame. At the same time, the mountings for the wheels are such that the driving connections for the rear wheels and the steering connections for the forward wheels, as well as the mounting instrumentalities for the wheels themselves, are all normally located in a plane not lower than the lower edge of the chassis frame. This imparts a streamlined effect to the under surface of the vehicle, in that there are no depending structural elements below the chassis frame.

What I claim is:

1. In a mounting for vehicle wheels, the combination of the side sill of the vehicle chassis frame, a shaft protruding outwardly through the sill, a member journaled concentrically of said shaft for rocking in a vertical plane outside said sill, a wheel axle carried by said member, an extension on said member, a spring housing pivoted on the sill, and springs carried in said housing engaging said extension above and beneath the latter to yieldingly resist rocking motion of said member.

2. In a wheel mounting for vehicles, the combination of the side sill of the vehicle chassis frame, a wheel-supporting member, means extending through the side sill for pivotally supporting said member to rock in a vertical plane, a wheel supported in said member, a spring housing pivoted on a horizontal axis in the chassis frame, upper and lower springs in said housing, and an extension on said wheel-supporting member positioned between said upper and lower springs whereby rocking motion of the wheel-supporting member is yieldingly resisted.

3. In a vehicle wheel mounting, a wheel supporting member comprising one section pivotally secured to the chassis frame of the vehicle to rock in a vertical plane and a second section pivoted to the first section, an axle block pivoted to rock on a substantially vertical axis in said second member, an extension on said second member, spring means engaging said extension to yieldingly resist rocking motion of said members, and a pivoted support for said spring means.

4. In a vehicle wheel mounting, a wheel supporting member comprising two sections, means pivotally supporting one section on the chassis frame to rock in a vertical plane, means pivotally supporting the second section on the first section to rock in a vertical plane with respect to said first section, a steering wheel pivoted on a vertical axis in said second section, an extension on the second section, springs engaging said extension to yieldingly resist rocking motions of both of said sections, and a housing in which said springs are supported, said housing being pivoted to rock in a vertical plane toward and from the pivotal connection between the two sections of the wheel-supporting member.

5. In a mounting for vehicle wheels, the combination of the side sill of the vehicle chassis frame, a shaft protruding outwardly through the sill, a member journaled concentrically of said shaft for rocking in a vertical plane outside said sill, a wheel axle carried by said member, an extension on said member, means engaging said extension above and beneath the latter to yieldingly resist rocking motion of said member, and a housing for said last-mentioned means pivoted on said sill.

JOHN MORRIS POCHÉ